Inventor

# United States Patent Office 2,955,506
Patented Oct. 11, 1960

2,955,506

METAL CASING FOR SUPPORTING OPTICAL ELEMENTS

Rudolf Müller, Jena, Germany, assignor to VEB Carl Zeiss Jena, Jena, Germany

Filed Dec. 27, 1954, Ser. No. 477,673

2 Claims. (Cl. 88—1)

This invention relates to optical instruments, particularly field-glasses, with a metal casing for supporting and maintaining a plurality of optical and other elements in spaced relation to each other, said casing being provided with a coating of synthetic plastic for the purpose of protection against corrosion.

In order to reduce the weight of a casing of this type to a minimum and also ensure that the coating of synthetic plastic adheres well to the metal, the casing according to the present invention is formed by a rigid metallic sheet material containing a plurality of perforations, so that points of connection are available between the synthetic plastic coatings on the inner and outer walls of the casing. Preferably, the casing consists of sheet metal, advantageously of light metal, constructed in the manner of a sieve.

The construction of the casing according to the invention is particularly advantageous for field glasses, in which a saving in weight is an important requirement.

Figure 1:
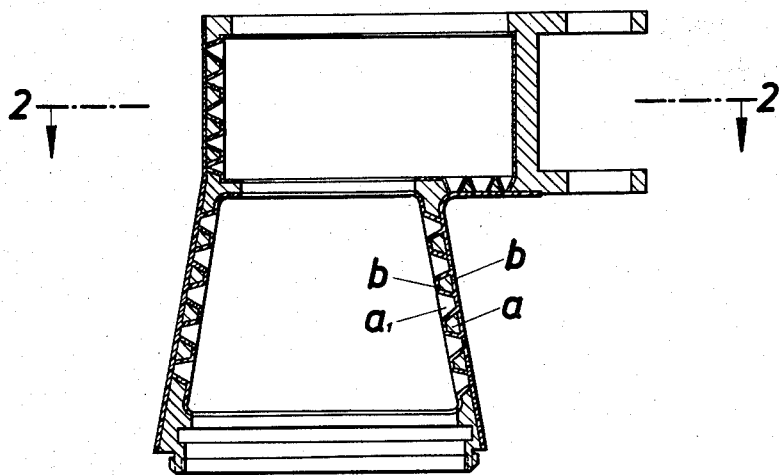
Figure 2:
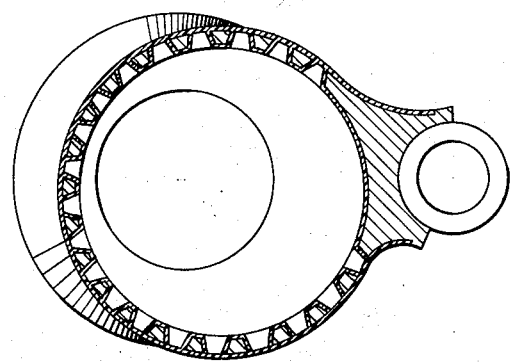

In order that the invention may be more readily understood, reference is made to the accompanying drawing, which illustrates diagrammatically and by way of example one embodiment in accordance therewith, and in which:

Figure 1 is a longitudinal section through part of a casing for a binocular field glass; and Figure 2 is a cross section taken on the line 2—2 of Figure 1.

The casing part comprises a rigid light-metal sheet body $a$, the wall of which contains a multiplicity of holes $a^1$. The metal body is provided internally and externally with a synthetic plastic coating $b$. The inner and outer coatings $b$ are permanently connected to one another through the holes $a^1$.

I claim:

1. An optical instrument comprising a metallic casing having means for supporting a plurality of optical and other elements in properly spaced relation to each other, said casing being formed by a rigid metallic sheet material containing a plurality of holes, each side of said sheet material being covered with a synthetic plastic coating extending through said holes and thereby so connecting the outer and the inner portion of said coating permanently to each other and to said sheet material as to form a protection of said metallic casing against corrosion.

2. An optical instrument comprising a metallic casing having means for supporting a plurality of optical and other elements in properly spaced relation to each other, said casing being formed by a rigid metallic sheet material, preferably light metal, containing a plurality of holes in the manner of a sieve, each side of said sheet metal being covered with a synthetic plastic coating extending through said holes and thereby so connecting the outer and the inner portion of said coating permanently to each other and to said sheet metal as to form a protection of said metallic casing against corrosion.

References Cited in the file of this patent

UNITED STATES PATENTS

| | | |
|---|---|---|
| 1,206,287 | Auerbacher | Nov. 28, 1916 |
| 1,546,599 | Jensen | May 29, 1923 |
| 1,505,272 | Mart | Aug. 19, 1924 |
| 1,933,616 | Canon | Nov. 7, 1933 |
| 1,952,224 | Trautmann et al. | Mar. 27, 1934 |
| 2,312,293 | Weiss | Feb. 23, 1943 |
| 2,372,479 | French | Mar. 27, 1945 |

FOREIGN PATENTS

| | | |
|---|---|---|
| 561,001 | France | July 25, 1923 |
| 624,652 | Great Britain | June 14, 1949 |